United States Patent Office 3,440,280
Patented Apr. 22, 1969

3,440,280
PROCESS FOR THE PREPARATION OF ACRYLAMIDE AND METHACRYLAMIDE PERCHLORATES
James L. Chaille, Camden, S.C., and Samuel F. Reed, Jr., Huntsville, Ala., assignors to Rohm & Haas Company, Philadelphia, Pa., a corporation of Delaware
No Drawing. Filed Sept. 20, 1960, Ser. No. 57,870
Int. Cl. C07c 103/02
U.S. Cl. 260—561   7 Claims This invention concerns an improved process for the preparation of organic perchlorates. More particularly, it concerns a process for the preparation of acrylamide and alkacrylamide perchlorates.

Acrylamides and alkacrylamide perchlorates have been previously prepared as set forth in Ser. No. 798,291, filed Mar. 9, 1959, and in the hands of the same assignee. As set forth therein, the amide is mixed with a stoichiometric quantity of 72% concentrated perchloric acid and the "free" water removed from the mixture under vacuum. However, because the reaction mixture and the products produced are both unstable in that they will explode at elevated temperatures, it is necessary to effect the water removal at relatively low temperatures which results in prolonged reaction times. Because the amide reactants and the resulting products are polymerizable, large amounts of polymerization inhibitors must be used and even under these conditions, there is a danger of premature polymerization. Furthermore, the hereinbefore described process presents difficulties in the preparation of acrylamide perchlorate because of the difficulties encountered in maintaining fluidity in the reaction mixture throughout the lengthy dehydration period which was necessary.

It has been found that these difficulties are overcome when the acrylamide and alkacrylamide perchlorates are prepared by reacting the corresponding acryloyl or alkacryloyl isocyanates with 70 to 72% concentrated perchloric acid. The product is subjected to vacuum to strip any trace of volatiles. The reaction is as shown below:

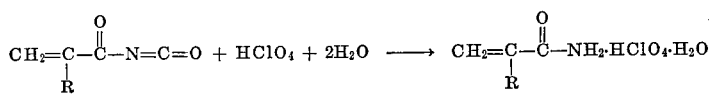

R in the above formula is hydrogen or lower alkyl containing 1 to 4 carbon atoms. $HClO_4 + 2H_2O$ represents the commercial concentrated $HClO_4$ containing 70 to 72% $HClO_4$.

The monomeric and polymeric forms of these perchlorate salts exhibit high energy and the monomeric form can be polymerized in the presence of other components commonly used in solid propellant charges to produce charges or "grains" with the required physical and chemical properties. The use of these perchlorate salts in propellants is set forth in detail in Ser. No. 3,200, filed Jan. 20, 1960, and in the hands of the same assignee. This information is incorporated herein by reference.

The acryloyl isocyanates which can be used in the process of the present invention are of the general formula

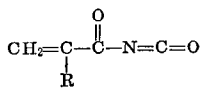

in which R is H or lower alkyl containing 1 to 4 carbon atoms. Whereas the higher alkacryloyl isocyanates react satisfactorily, the preferred compounds are acryloyl and methacryloyl isocyanates because of their lower cost and common availability.

The method of preparation of the acryloyl isocyanates is straightforward and is well-known to those skilled in the art. They can be prepared by the interaction of the corresponding acryloyl chlorides and silver isocyanates according to the method of Lieser and Kemmner (Chem. Ber., 84, 4 (1951)) and the process is incorporated herein by reference.

It is possible to use perchloric acid of lower concentration than 70 to 72%, but the use of lower concentrations require longer evacuation periods after the reaction is complete. The 70 to 72% concentration is preferred.

While it is possible to vary the ratios of isocyanate to $HClO_4$ and still obtain the desired products, molar ratios other than 1:1 necessitate additional purification steps and are not preferred.

The reaction is exothermic and since the temperature should be maintained below 50° C., it is necessary to cool the reaction mixture or to control the exotherm by controlled or incremental addition of the reactants. The order of addition is not critical, i.e. the isocyanate can be added to the perchloric acid or the order of addition can be reversed. Reaction temperatures lower than 50° C. can be employed but as would be expected, the reaction rates are slower. Thus, the reaction proceeds at temperatures as low as 15° C.

In view of the polymerizable nature of the acryloyl isocyanates as well as the resultant perchlorate salts, it is advisable to carry out the reaction in the presence of a polymerization inhibitor. Inhibitors for preventing polymerization of acrylates are well-known and include such compounds as sodium nitrite, hydroquinone, t-butyl catechol and the like. When using sodium nitrite and adding the isocyanate to the perchloric acid, from about 0.05 to about 0.2% sodium nitrite on the weight of the perchlorate is employed. The sodium nitrite is added to the aqueous perchloric acid.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I 3.9 grams of methacryloyl isocyanate were reacted with 3.5 grams of 70% perchloric acid using 0.1% sodium nitrite, dissolved in the acid, as an inhibitor. This addition was made at 0–5° C. and adding the isocyanate at such a rate as to maintain the reaction temperature below 40° C. After the addition was complete, the mix (yellow liquid) was evacuated under a 1 mm. vacuum for twenty minutes. The product was identical with an authentic sample of methacrylamide perchlorate monohydrate prepared as set forth in Ser. No. 798,291, referred to hereinbefore.

EXAMPLE II

To a flask containing 8.29 grams of 70% perchloric acid and 0.1% sodium nitrite cooled to 0–5° C. was added 8.0 grams acryloyl isocyanate. A maximum temperature of 36° C. was reached during the isocyanate addition. The reaction mixture was evacuated under a vacuum of 10 mm. for 20 minutes to remove traces of volatiles. The product was identical with an authentic sample of acrylamide perchlorate monohydrate prepared and identified by elemental analysis as set forth in Ser. No. 798,291 referred to hereinbefore.

EXAMPLE III

Comparable results were obtained when equimolar amounts of ethacryloyl and butacryloyl isocyanates were substituted for the acryloyl isocyanate of Example II and the reaction carried out under the same conditions.

We claim:
1. A process for the preparation of a compound selected from the group consisting of acrylamide perchlorate salts and alkacrylamide perchlorate salts which comprises reacting an acryloyl isocyanate of the formula

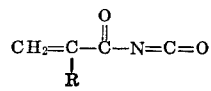

in which R is selected from the group consisting of hydrogen and lower alkyl containing 1 to 4 carbon atoms with perchloric acid and recovering the perchlorate salts so formed.

2. A process as set forth in claim 1 in which the acryloyl isocyanate is acryloyl isocyanate.
3. A process as set forth in claim 1 in which the acryloyl isocyanate is methacryloyl isocyanate.
4. A process as set forth in claim 1 in which the perchloric acid is an aqueous solution containing 70 to 72% perchloric acid.
5. A process as set forth in claim 1 in which the reaction temperature is 15 to 50° C.
6. A process as set forth in claim 1 in which the reaction mixture contains a compound which inhibits the polymerization of the acryloyl and alkacryloyl radical.
7. A process as set forth in claim 6 in which the polymerization inhibitor is sodium nitrite.

References Cited

Emeleus et al.: Advances in Inorganic Chemistry, vol. 8, 1966, Academic Press, New York, pp. 198 to 200 and 218 to 224.

LELAND A. SEBASTIAN, *Primary Examiner.*

U.S. Cl. X.R.
149—75, 19, 109